United States Patent  
Ferslew et al.

(10) Patent No.: US 11,174,735 B2
(45) Date of Patent: Nov. 16, 2021

(54) PATCH RINGS AND METHODS OF USE

(71) Applicant: General Electric Company, Schenectady, NY (US)

(72) Inventors: Matthew Ryan Ferslew, Simpsonville, SC (US); Katherine Courtlyn MacManus, Norcross, GA (US); Srinivas Ravi, Simpsonville, SC (US); John Herbert Dimmick, Greenville, SC (US); Jonathan Michael Webster, Greenville, SC (US); Gang Liu, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 48 days.

(21) Appl. No.: 16/724,852

(22) Filed: Dec. 23, 2019

(65) Prior Publication Data

US 2021/0189899 A1 Jun. 24, 2021

(51) Int. Cl.
*F01D 5/00* (2006.01)
*F01D 5/02* (2006.01)
(Continued)

(52) U.S. Cl.
CPC ............. *F01D 5/026* (2013.01); *F01D 5/005* (2013.01); *F01D 25/00* (2013.01); *F04D 29/044* (2013.01);
(Continued)

(58) Field of Classification Search
CPC .......... F01D 5/026; F01D 5/005; F01D 25/00; F04D 29/054; F04D 29/044;
(Continued)

(56) References Cited

U.S. PATENT DOCUMENTS 2,619,317 A * 11/1952 Traupel .................. F01D 5/066
416/95
3,713,676 A * 1/1973 Carlstrom ............... F01D 5/066
403/28
(Continued)

FOREIGN PATENT DOCUMENTS

EP 1813769 A1 8/2007

OTHER PUBLICATIONS

European Search Report Corresponding to Application No. 20212534 dated Apr. 26, 2021.

*Primary Examiner* — Brian P Wolcott
(74) *Attorney, Agent, or Firm* — Dority & Manning, P.A.

(57) ABSTRACT

Shaft assemblies, turbomachines, and methods of servicing a turbomachine are provided. A shaft assembly includes a first shaft having a first rabbet annularly defined therein. The first rabbet includes a first axially extending face and a first radially extending face. A second shaft coupled to the first shaft. The second shaft includes a second rabbet annularly defined therein and positioned opposite the first rabbet. The second rabbet includes a second axially extending face and a second radially extending face. A patch ring is mounted between the first rabbet and the second rabbet. The patch ring includes a main body positioned between and in contact with the first axially extending face and the second axially extending face. A first arm extends radially outward from the main body, and a second arm extends radially inward from the main body.

16 Claims, 7 Drawing Sheets

(51) Int. Cl.
*F01D 25/00* (2006.01)
*F04D 29/04* (2006.01)
*F04D 29/044* (2006.01)
*F04D 29/054* (2006.01)
*F16D 1/02* (2006.01)
*F01D 11/12* (2006.01)

(52) U.S. Cl.
CPC ....... *F04D 29/0405* (2013.01); *F04D 29/054* (2013.01); *F16D 1/02* (2013.01); *F16D 2250/0084* (2013.01); *F16D 2300/00* (2013.01)

(58) Field of Classification Search
CPC ...... F04D 29/0405; F04D 29/644; F16D 1/02; F16D 2300/00; F16D 2250/0084
See application file for complete search history.

(56) References Cited

U.S. PATENT DOCUMENTS

| | | | |
|---|---|---|---|
| 4,242,008 A * | 12/1980 | Bernasconi | F16D 1/06 403/13 |
| 7,811,052 B2 | 10/2010 | Guihard et al. | |
| 9,909,595 B2 * | 3/2018 | Colletti | F01D 5/066 |
| 10,907,476 B2 * | 2/2021 | Cooper | F16D 1/05 |
| 2017/0023020 A1 | 1/2017 | Colletti et al. | |
| 2020/0072054 A1 * | 3/2020 | Laroche | F01D 5/026 |

\* cited by examiner

PATCH RINGS AND METHODS OF USE

FIELD

The present disclosure relates generally to improved patch rings and associated methods. In particular, the disclosure relates to improved patch rings for use in turbomachine marriage joints.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

During operation of a turbomachine, the various components of the turbomachine endure various forms of wearing. Such wearing can lead to damage and/or failure of the individual components and the turbomachine in general. In particular, the compressor shaft and the turbine shaft, which rotate during operation of the turbomachine, are susceptible to wearing. For example, present compressor and turbine shafts may be expected to operate for approximately 144,000 hours and 5,000 starts. Further, in many cases, specific wear sensitive locations on the components, such as the rabbet flanges, may tend to wear faster than other locations. These wear sensitive locations may limit the lives of the associated compressor shafts and/or turbine shafts.

Defects in the compressor shaft and turbine shaft must be repaired so they maintain design intent. Currently, the compressor shaft and turbine shaft are repaired by post-operational machining on the contact surface defined between the shafts, in order to restore the design-specified interference between the two shafts. However, over multiple service intervals, machining the rabbet joint can negatively impact the desired contact interference between the compressor shaft and turbine shaft.

Accordingly, improved methods and apparatuses for repairing turbomachine joints is desired in the art. In particular, improved methods and apparatuses for repairing a rabbet joint between a compressor shaft and a turbine shaft is desired.

BRIEF DESCRIPTION

Aspects and advantages of the shaft assemblies, turbomachines, and methods of servicing a turbomachine in accordance with the present disclosure will be set forth in part in the following description, or may be obvious from the description, or may be learned through practice of the technology.

In accordance with one embodiment, a shaft assembly is provided. The assembly includes a first shaft having a first rabbet annularly defined therein. The first rabbet includes a first axially extending face and a first radially extending face. A second shaft coupled to the first shaft. The second shaft includes a second rabbet annularly defined therein and positioned opposite the first rabbet. The second rabbet includes a second axially extending face and a second radially extending face. A patch ring is mounted between the first rabbet and the second rabbet. The patch ring includes a main body positioned between and in contact with the first axially extending face and the second axially extending face. A first arm extends radially outward from the main body, and a second arm extends radially inward from the main body.

In accordance with another embodiment, a turbomachine is provided. The turbomachine includes a compressor section, a combustor section, and a turbine section. The turbomachine further includes a compressor shaft at least partially disposed in the compressor section. The compressor shaft having a first rabbet annularly defined therein. The first rabbet includes a first axially extending face and a first radially extending face. The turbomachine further includes a turbine shaft at least partially disposed in the turbine section and coupled to the compressor shaft. The turbine shaft having a second rabbet annularly defined therein and positioned opposite the first rabbet. The second rabbet includes a second axially extending face and a second radially extending face. A patch ring is mounted between the first rabbet and the second rabbet.

In accordance with yet another embodiment, a method of servicing a turbomachine is provided. The method includes machining a first rabbet within an aft end of a compressor shaft. The first rabbet includes a first axially extending face and a first radially extending face. The first rabbet is annularly defined within the aft end of the compressor shaft. The method further includes machining a second rabbet within a forward end of a turbine shaft. The second rabbet includes a second axially extending face and a second radially extending face. The second rabbet is annularly defined within the forward end of the turbine shaft and positioned opposite the first rabbet. The method further includes installing a patch ring between the first rabbet and the second rabbet.

These and other features, aspects and advantages of the present shaft assemblies, turbomachines, and methods of servicing a turbomachine will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present shaft assemblies, turbomachines, and methods of servicing a turbomachine, including the best mode of making and using the present systems and methods, directed to one of ordinary skill in the art, is set forth in the specification, which makes reference to the appended figures, in which.

DETAILED DESCRIPTION

Figure 1:
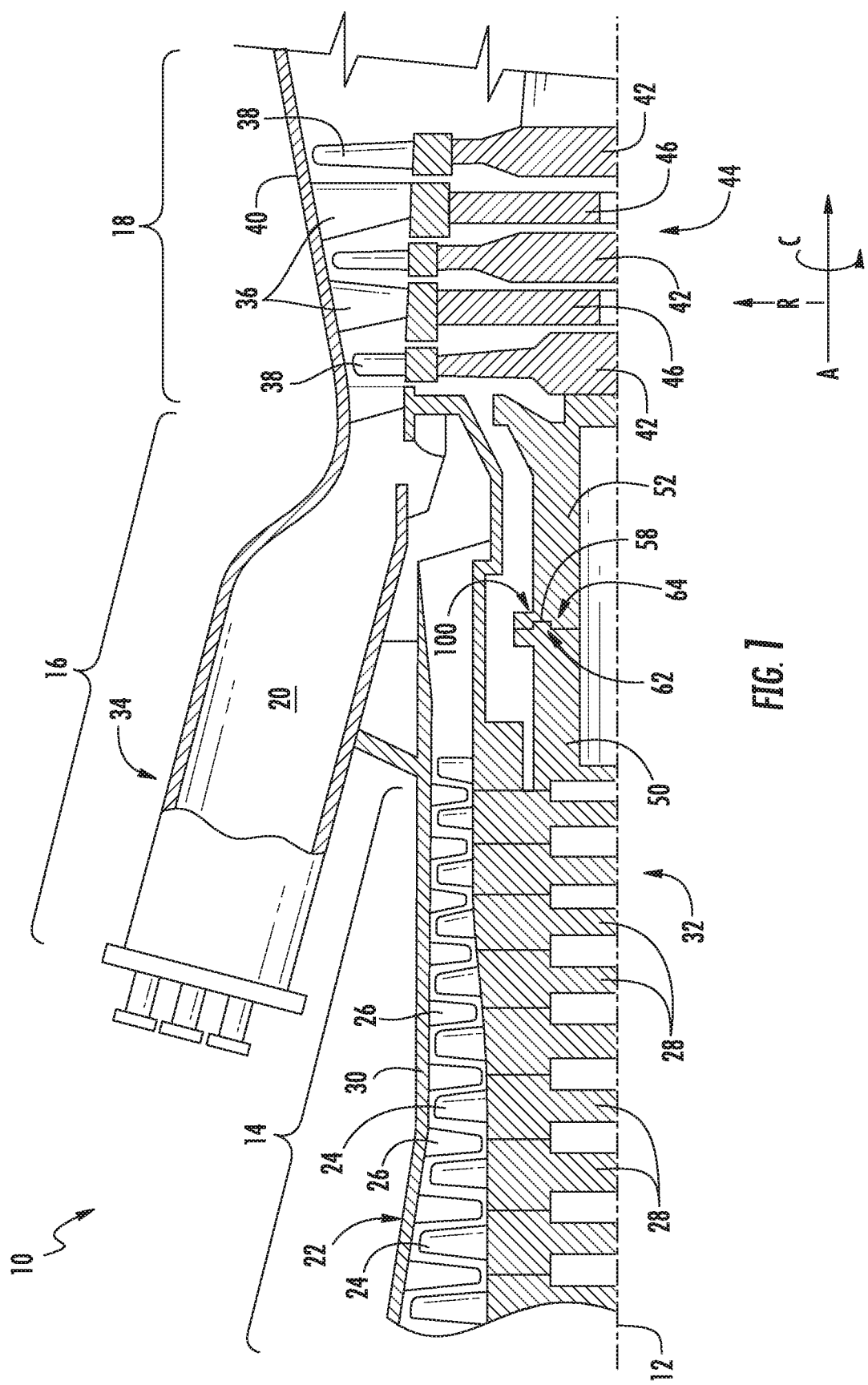
FIG. 1 is a schematic illustration of a turbomachine in accordance with embodiments of the present disclosure.

Reference now will be made in detail to embodiments of the present shaft assemblies, turbomachines, and methods of servicing a turbomachine, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, FIG. 1 illustrates a partial, cross-sectional view of one embodiment of a turbomachine, which in the illustrated embodiment is a gas turbine 10. Although an industrial or land-based gas turbine is shown and described herein, the present disclosure is not limited to a land-based and/or industrial gas turbine unless otherwise specified in the claims. For example, the invention as described herein may be used in any type of turbomachine including but not limited to a steam turbine, an aircraft gas turbine, or a marine gas turbine.

As shown, the gas turbine 10 as shown is cut-off at the turbine's centerline 12. As shown, the gas turbine 10 includes a compressor section 14, a combustor section 16 disposed downstream of the compressor section 14 and a turbine section 18 disposed downstream of the combustor section 16. The compressor section 14 may generally be configured to pressurize air flowing into the gas turbine 10. A portion of the pressurized air or working fluid then flows into the combustor section 16, wherein the air is mixed with fuel and combusted. Hot gases of combustion then flow through a transition piece 20 along an annular hot gas path to the turbine section 18 to drive the gas turbine 10 and generate power.

In several embodiments, the compressor section 14 may include an axial flow compressor 22 having a plurality of compressor stages characterized by alternating rows of rotor blades 24 and stator vanes 26. Specifically, each compressor stage may include a row of circumferentially spaced rotor blades 24 mounted to a compressor rotor wheel 28 and a row of circumferentially spaced stator vanes 26 attached to a static compressor casing 30. The alternating rows of rotor blades 24 and stator vanes 26 may generally be configured to incrementally increase the pressure of the air flowing through the compressor 22 such that a desired increase in pressure is reached. The compressor rotor wheels 28, along with the rotor blades 24, generally comprise the rotating components of the compressor 22 and, thus, may form a compressor rotor assembly 32. For example, in several embodiments, the compressor rotor disks 28 may be stacked axially against one another about the turbine centerline 12 such that torque may be transmitted between the rotor disks 28.

The combustion section 16 of the gas turbine 10 may generally include a plurality of combustors 34 (one of which is shown) disposed in an annular array about the turbine centerline 12. Each combustor 34 may generally be configured to receive a portion of the pressurized air discharged from the compressor 22, mix the air with fuel to form an air/fuel mixture and combust the mixture to produce hot gases of combustion. As indicated above, the hot gases of combustion may then flow from each combustor 34 through a transition piece 20 to the turbine section 18 of the gas turbine 10.

The turbine section 18 may generally include a plurality of turbine stages characterized by alternating rows of turbine nozzles 36 and turbine buckets 38. In particular, each turbine stage may include a row of circumferentially spaced turbine nozzles 36 attached to a static turbine casing 40 and a row of circumferentially spaced turbine buckets 38 mounted to a turbine rotor wheel 42. The alternating rows of turbine nozzles 36 and buckets 38 may generally be configured to incrementally convert the energy of the hot gases of combustion into work manifested by rotation of the turbine rotor disks 42. The turbine rotor wheels 42, along with the turbine buckets 38, may generally comprise the rotating components of the turbine section 18 and, thus, may form a turbine rotor assembly 44. Similar to the compressor rotor wheels 28, the turbine rotor wheels 42 may generally be stacked together axially along the turbine centerline 12. For example, as shown in FIG. 1, the turbine rotor wheels 42 may be spaced apart from one another by spacer wheels 46, with the rotor wheels 42 and spacer wheels 46 being stacked axially against one another such that torque may be transmitted between the rotor disks 42. Spacer wheels may additionally or alternatively space art the compressor rotor wheels 28.

As shown in FIG. 1, the gas turbine 10 may define an axial direction A and a circumferential direction C which extends around the axial direction A. The gas turbine 10 may also define a radial direction R perpendicular to the axial direction A.

Figure 2:
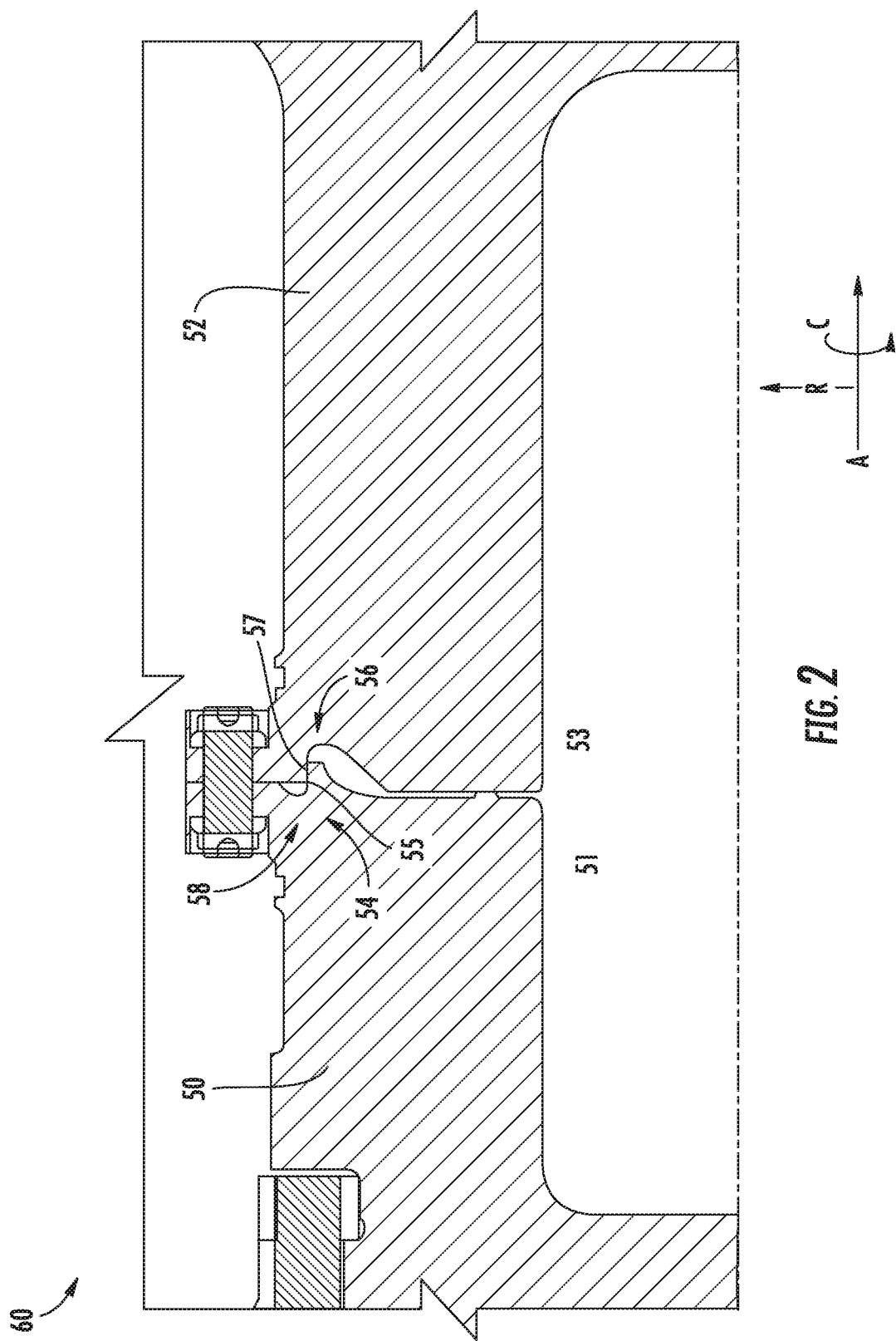
FIG. 2 illustrates a cross-sectional view of a shaft assembly prior to the installation of a patch ring in accordance with embodiments of the present disclosure.

As further shown in FIG. 1, and referring also to FIG. 2, the gas turbine 10 may further include a compressor shaft 50 at least partially disposed within the compressor section 14 and a turbine shaft 52 at least partially disposed within the turbine section 18. The shafts 50, 52 may couple the compressor rotor assembly 32 and the turbine rotor assembly 44 together. As shown, the compressor shaft 50 may include an aft end 51 that couples to a forward end 53 of the turbine shaft 52. Each shaft 50, 52 may include one or more rabbets, e.g., a first rabbet 62 and a second rabbet 64. The first rabbet 62 may be annularly defined within the aft end 51 of the compressor shaft 51. Similarly, the second rabbet 64 may be annularly defined within the forward end 53 of the turbine shaft 52. In many embodiments, the compressor shaft 50 may extend from the compressor section 14, axially outward, and terminate at the first rabbet 62 defined within the aft end 51 of the compressor shaft 50. Likewise, the turbine shaft 52 may extend from the turbine section 18, axially inward, and terminate at the second rabbet 64 defined within the forward end 53 of the turbine shaft 52. The rabbets 62, 64 may form a marriage joint 58, which functions to couple the compressor rotor assembly 32 to the turbine rotor assembly 44 and maintain coaxial alignment between the compressor shaft 50 and the turbine shaft 52.

FIG. 2 illustrates a cross-sectional view of a shaft assembly 60, prior to having service maintenance performed thereon and the installation of a patch ring 100 therein (as shown in FIGS. 3 through 9). In various embodiments, the shaft assembly 60 shown in FIG. 2 may be before or after operation of the gas turbine 10. As shown, the shaft assembly 60 may include a compressor shaft 50 coupled to a turbine shaft 52 to form a marriage joint 58 therebetween. As shown, the compressor shaft 50 may include a first pre-machined rabbet 54. Likewise, the turbine shaft 52 may include a second pre-machined rabbet 56 opposite the first pre-machined rabbet 54. The first pre-machined rabbet 54 may include a first axially extending face 55, and the second pre-machined rabbet 56 may include a second axially extending face 57. As shown, prior to installation of a patch ring 100, the first axially extending face 55 of the first pre-machined rabbet 54 is in direct contact with the second axially extending face 57 of the second pre-machined rabbet 56.

During disassembly of the turbomachine for service or repair, the turbine shaft 50 is disconnected from the compressor shaft 52 and inspected. The turbine shaft 50 and the compressor shaft 52 may become damaged during this process, and this damage may be from operational wear and tear or from the actual disassembly process itself. The first rabbet 62 and the second rabbet 64 (FIG. 1) are common places for this damage to occur.

Figure 3:
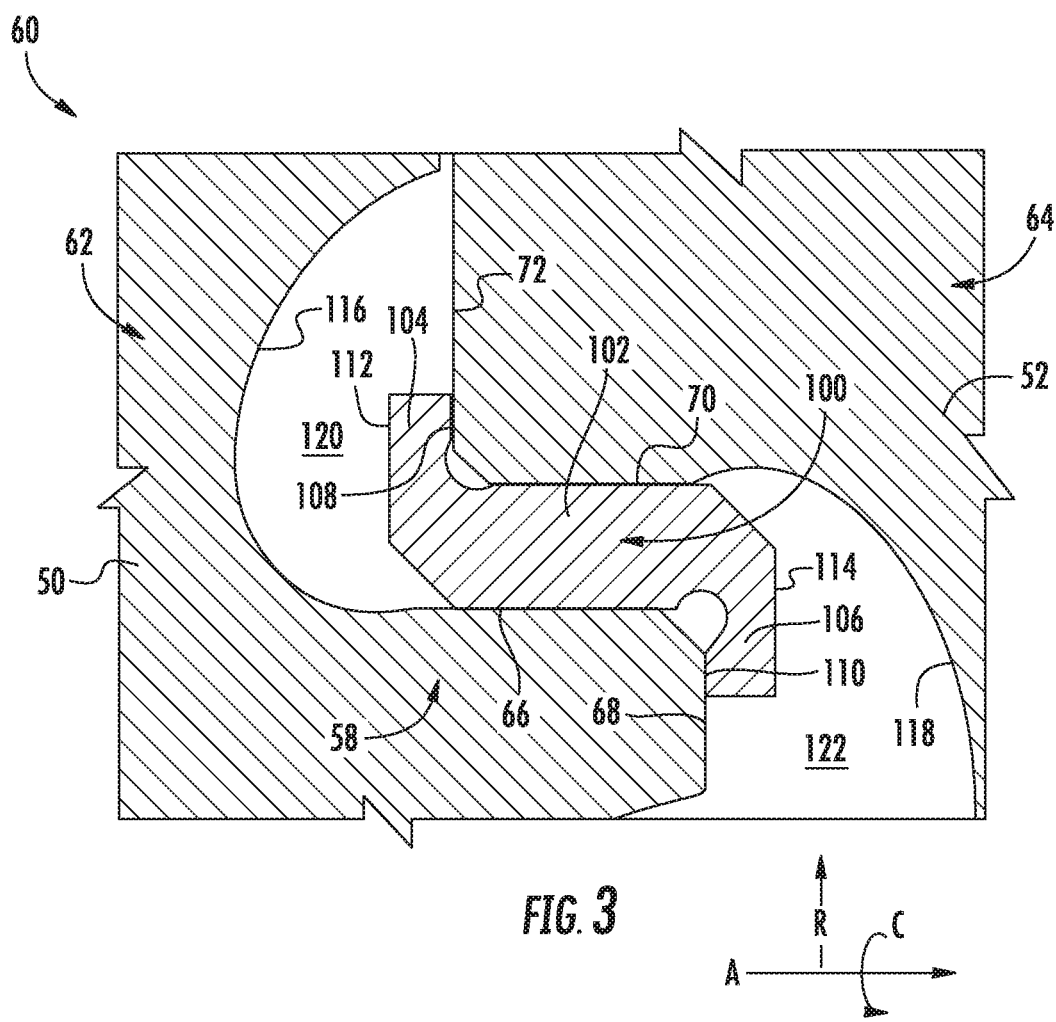
FIG. 3 illustrates a cross sectional view of a shaft assembly showing a patch ring positioned therein in accordance with embodiments of the present disclosure.
Figure 4:
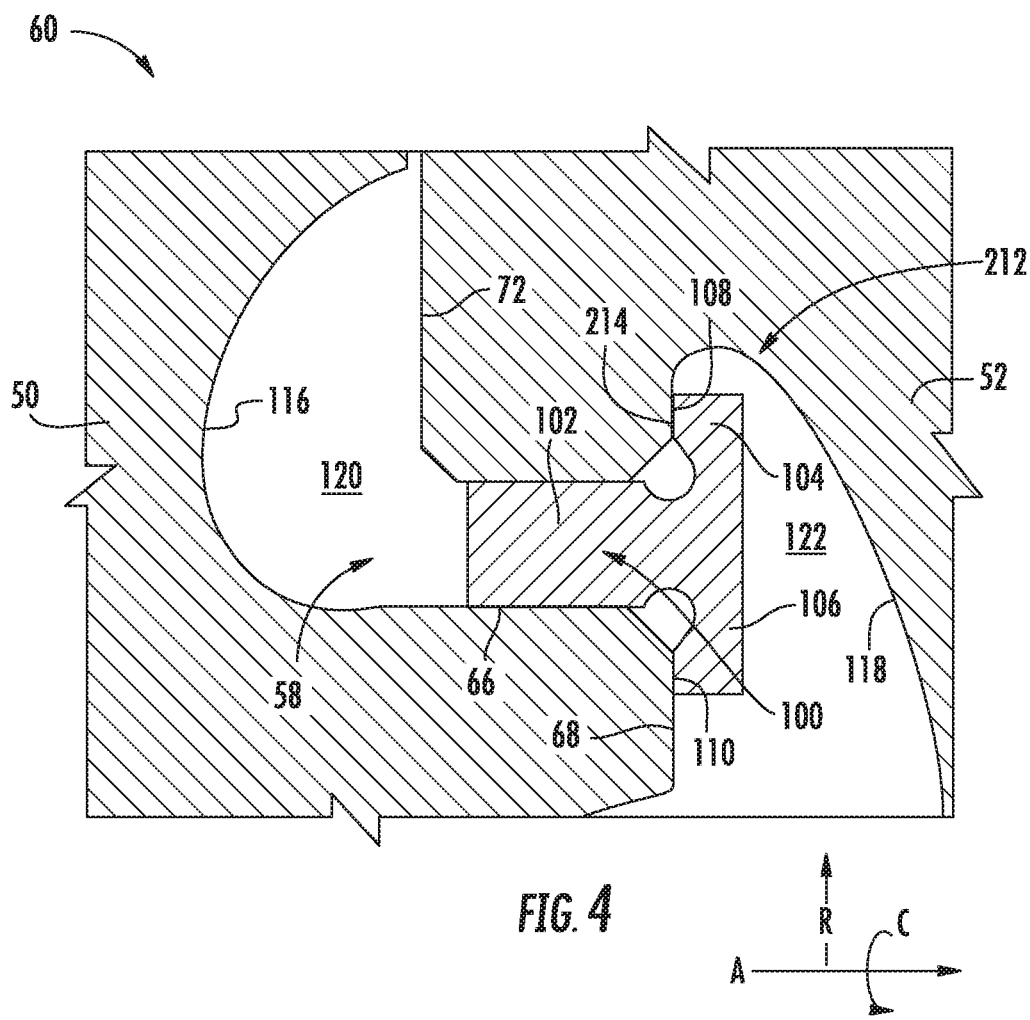
FIG. 4 illustrates a cross sectional view of a shaft assembly showing a patch ring positioned therein in accordance with embodiments of the present disclosure.

FIGS. 3 and 4 illustrate enlarged cross-sectional views of shaft assemblies 60 with the patch ring 100 in position, e.g. after servicing of the gas turbine 10, in accordance with embodiments of the present disclosure. As shown, the shaft assemblies 60 may each include a compressor shaft 50, a turbine shaft 52 coupled to the compressor shaft 50, and a marriage joint 58 defined therebetween. The compressor shaft 50 may include first rabbet 62 annularly defined within the compressor shaft 50. Likewise, the turbine shaft 52 may include a second rabbet 64 annularly defined within the turbine shaft 52. For example, the first rabbet 62 and the second rabbet 64 may be machined within the shafts 50, 52 in the circumferential direction C. A patch ring 100 may be disposed between the first rabbet 62 of the compressor shaft 50 and the second rabbet 64 of the turbine shaft 52.

In many embodiments, the first rabbet 62 may be positioned opposite the second rabbet 64. For example, in the embodiment shown in FIGS. 3 and 4, the first rabbet 62 of the compressor shaft 50 may be disposed radially inward the second rabbet 64 of the turbine shaft 52. However, in other embodiments (not shown), the first rabbet 62 of the compressor shaft 50 may be disposed radially outward the second rabbet 64 of the turbine shaft 52.

As shown in FIGS. 3 and 4, the first rabbet 62 may include a first axially extending face 66 and a first radially extending face 68. Likewise, the second rabbet 64 may include a second axially extending face 70 and a second radially extending face 72. As shown in FIGS. 3 and 4, the axially extending faces 66, 70 and radially extending faces 68, 72 may be substantially flat surfaces. Further, as shown, the axially extending faces 66, 70 and radially extending faces 68, 72 may be the outermost surfaces of the rabbets 62, 64.

As used herein, "axially extending" refers to a component and/or surface extending along the relative direction that is substantially parallel and/or coaxially aligned to the axial direction A of gas turbine 10. Similarly, "radially extending" refers to a component and/or surface extending along the relative direction that is substantially perpendicular to the axial direction A of gas turbine 10.

As shown, the first axially extending face 66 may be radially spaced apart from the second axially extending face 72, and the patch ring 100 may be positioned therebetween. In some embodiments, the patch ring 100 may be mounted between the first rabbet 62 and second rabbet 64 to advantageously provide the design-required interference between the first axially extending face 66 and the second axially extending face 72. Further, the patch ring 100 may also reduce or prevent damaging axial movement between the axially extending faces 66, 72 during operation of the gas turbine 10.

In many embodiments, as shown in FIGS. 3 and 4, the first rabbet 62 and second rabbet 64 may axially overlap with one another. For example, the first radially extending face 68 of the first rabbet 62 may extend axially beyond the second radially extending face 72 of the second rabbet 64. Specifically, the first radially extending face 68 may extend axially outward and beyond the second radially extending face 72. In such embodiments, the first axially extending face 66 may face towards, overlap with, and/or be parallel to, the second axially extending face 70.

Patch ring 100 may include a main body 102 a first arm 104 and a second arm 106. In the embodiments shown in FIGS. 3 and 4, the main body 102 of patch ring 100 may be positioned radially between the first axially extending face 66 of the compressor shaft 50 and the second axially extending face 70 of the turbine shaft 52. For example, the main body 102 of patch ring 100 may function to radially space apart the first axially extending face 66 of the first rabbet 62 from the second axially extending face 70 of the second rabbet 64 to provide proper alignment between the compressor shaft 50 and the turbine shaft 52. As shown in FIGS. 3 and 4, the main body 102 may be in direct contact with both the first axially extending face 66 and the second axially extending face 70.

In the embodiment shown in FIG. 3, the first arm 104 and the second arm 106 may extend radially away from the main body 102. For example, as shown, the first arm 104 may extend radially outward from the main body 102 of patch ring 100, and the second arm 106 may extend radially inward the main body of patch ring 100. As shown in FIG. 3, the first arm 104 may extend radially outwardly from the main body 102, beyond the second axially extending face 70, and at least partially along the second radially extending face 72. Similarly, the second arm 104 may extend radially inwardly from the main body 102, beyond the first axially extending face 66, and at least partially along the first radially extending face 68. In many embodiments, the first arm 104 and the second arm 106 may be in direct contact with the second rabbet 64 and first rabbet 62 respectively.

As shown in FIG. 3, the first arm 104 may be axially spaced apart from the second arm 106, i.e., positioned on opposite sides of the main body. In some embodiments, the first arm 104 and second arm 106 may extend in opposite radial directions to one another, and on opposite axial sides of the main body 102, to form a generally "S" like shape.

The first arm 104 and second arm 106 may each include a support surface 108, 110, as shown. For example, the support surface 108 of the first arm 104 may be a substantially flat surface in direct contact with the second radially extending face 72. Similarly, the support surface 110 of the second arm 106 may be a substantially flat surface in direct contact with the first radially extending face 68. For example, the support surface 108 of the first arm and support surface 110 of the second arm 106 may be substantially flat surfaces that directly abut the second radially extending face 72 and first radially extending face 68, respectively. The support surfaces 108, 110 of the arms 104, 106 may function to prohibit movement and/or sliding of the patch ring 100 within the marriage joint 58.

As shown in FIG. 3, the first arm 104 and second arm 106 may each also include an exterior surface 112, 114. The exterior surface 112 of the first arm may be located axially inward of the support surface 108. Similarly, the exterior surface 114 of the second arm may be located axially outward of the support surface 110. As shown, the exterior surfaces 112, 114 may be longer than the support surfaces 108, 110 in the radial direction.

As shown in FIGS. 3 and 4, the first rabbet 62 of the compressor shaft 50 and the second rabbet 64 of the turbine shaft 52 may each further include an outer surface 116, 118. For example, the outer surfaces 116, 118 may be a substantially arcuate exterior surfaces that are axially spaced from the radially extending faces 68, 72 to define gaps 120, 122 therebetween. As shown, the outer surface 116 of the first rabbet 62 may be disposed axially inward the second radially extending face 72 and may define a gap 120 therebetween. Similarly, the outer surface 118 of the second rabbet 64 may be disposed axially outward the second radially extending face 72 and may define a gap 122 therebetween. In many embodiments the first rabbet 62 may at least partially extend into the second gap 122, and the second rabbet 64 may at least partially extend into the first gap 120.

In the embodiment shown in FIG. 3, the first arm 104 of the patch ring 100 may extend at least partially into the gap 120, and the second arm 106 may extend at least partially into the gap 122. The gaps 120, 122 may function to create axial space between the first arm 104 and the second arm 106 in order to allow for thermal expansion during operation of the gas turbine 10. The exterior surfaces 112, 114 may advantageously act as an intermediary surface that prevents the outer surfaces 116, 118 from contacting the radially extending faces 68, 72 due to thermal expansion during operation of the gas turbine 10.

FIG. 4 illustrates another embodiment of a patch ring 100. As shown, the first arm 104 may be coaxially aligned with the second arm 106, i.e., positioned the same side of the main body 102 and sharing the same axial centerline. In some embodiments, the first arm 104 and second arm 106 may extend in opposite radial directions to one another to form a generally "T" like shape.

In the embodiment shown in FIG. 4, the second rabbet 64 may further include a radial cutout 212 sized to receive the first arm 104 of the patch ring 100 therein. The radial cutout 212 may function to restrict the axial movement of the patch ring 100 within the marriage joint 58. For example, the first arm 104 may be positioned axially between, and in contact with, the support surface 108 and the outer surface 118 during operation of the gas turbine 10, thereby restricting the axial movement of patch ring 100 within marriage joint 58. As shown, the radial cutout 212 may further include a cutout support surface 214. The first arm 104 and second arm 106 may each include a support surface 108, 110, as shown. In many embodiments, the support surface 108 of the first arm 104 may a substantially flat surface in that directly abuts the cutout support surface 214. Similarly, the support surface 110 of the second arm 106 may be a substantially flat surface that directly abuts the first radially extending face 68. The support surfaces 108, 110 of the arms 104, 106 may function to prohibit movement and/or sliding of the patch ring 100 within the marriage joint 58.

Figure 5:
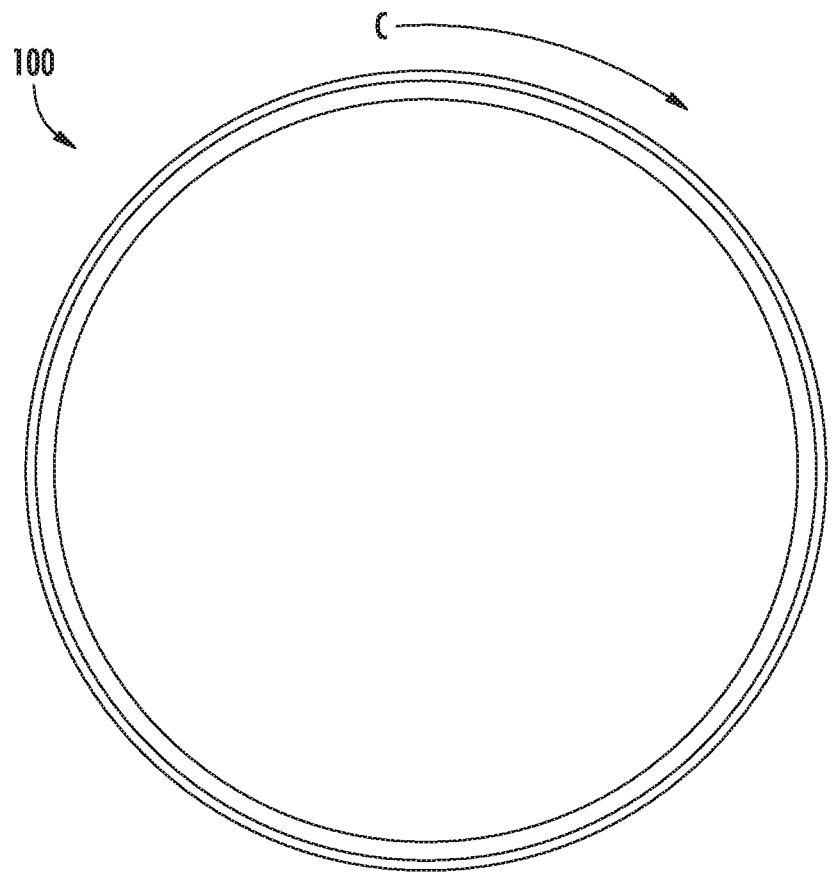
FIG. 5 illustrates a side view of a patch ring in accordance with embodiments of the present disclosure.
Figure 6:
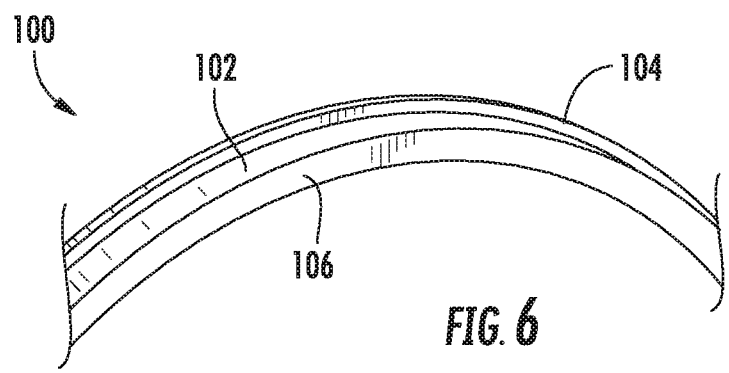
FIG. 6 illustrates an enlarged perspective view of the patch ring shown in FIG. 5 in accordance with embodiments of the present disclosure.

FIGS. 5 and 6 illustrate various views of patch ring 100, in accordance with embodiments of the present disclosure. As shown, the first arm 104 and the second arm 106 may each be one continuous annular member that extend in the circumferential direction. The first arm 104 and the second arm 106 may be defined along the circumferential direction.

Figure 7:
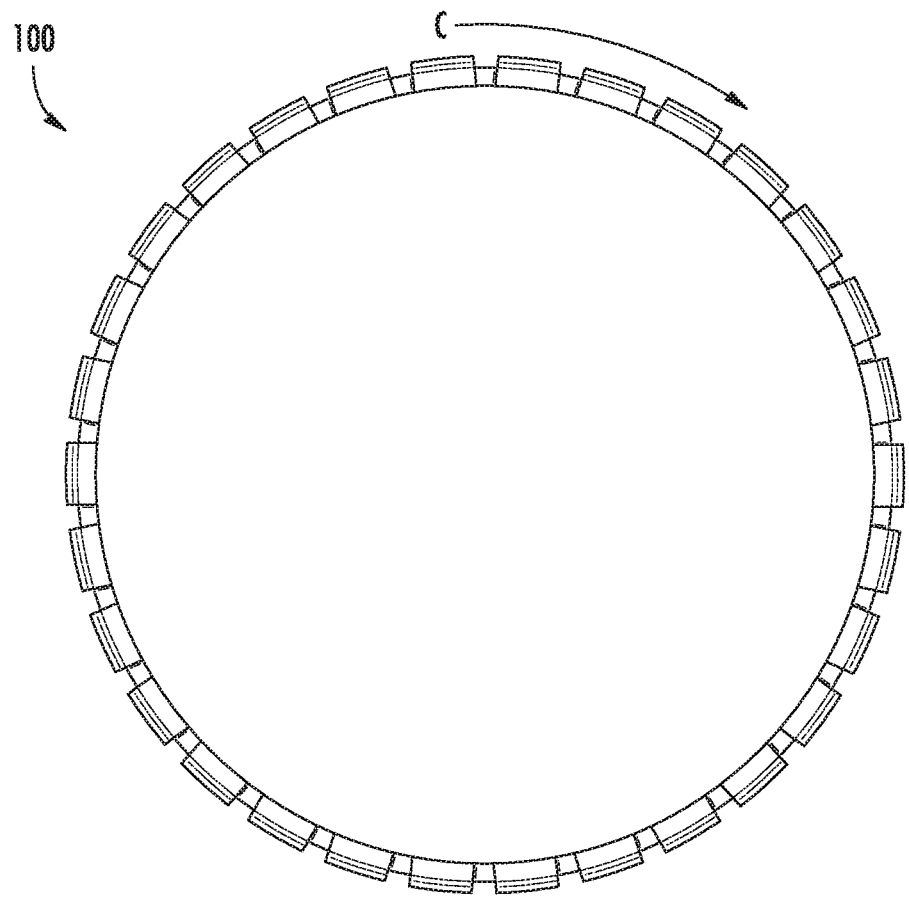
FIG. 7 illustrates a side view of a patch ring in accordance with embodiments of the present disclosure.
Figure 8:
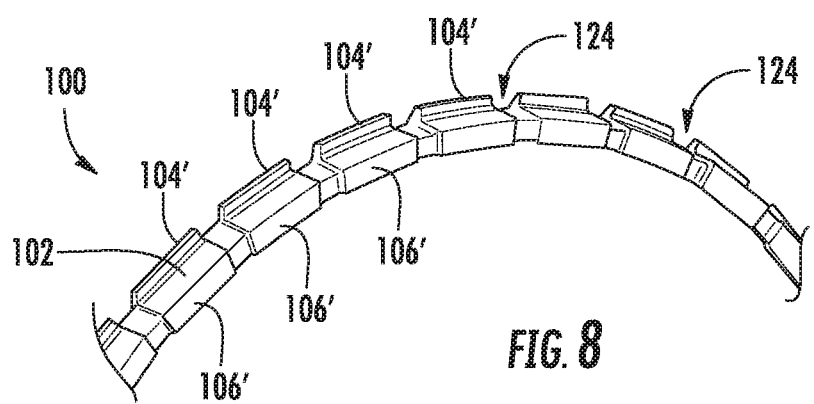
FIG. 8 illustrates an enlarged perspective view of the patch ring shown in FIG. 7 in accordance with embodiments of the present disclosure.

Alternatively, as shown in FIGS. 7 and 8, the first arm 104 may be a plurality of first arms 104' that are spaced apart from one another along the main body 102 in the circumferential direction C. Likewise, as shown, the second arm 106 may be a plurality of second arms 106' that are spaced apart from one another along the main body 102 in the circumferential direction C.

As shown in FIGS. 7 and 8, the patch ring 100 may also include one or more grooves 124 disposed circumferentially between the plurality of first arms 104' and/or the plurality of second arms 106'. The grooves 124 may extend radially into the main body 102 of patch ring 100 and function as a passageway for cooling air from the compressor to flow therethrough. For example, air from the compressor section 14 may purge stagnant air from the various cavities and crevices of the first rabbet 62 of the compressor shaft 50, the second rabbet 64 of the turbine shaft 52, and the patch ring 100.

Figure 9:
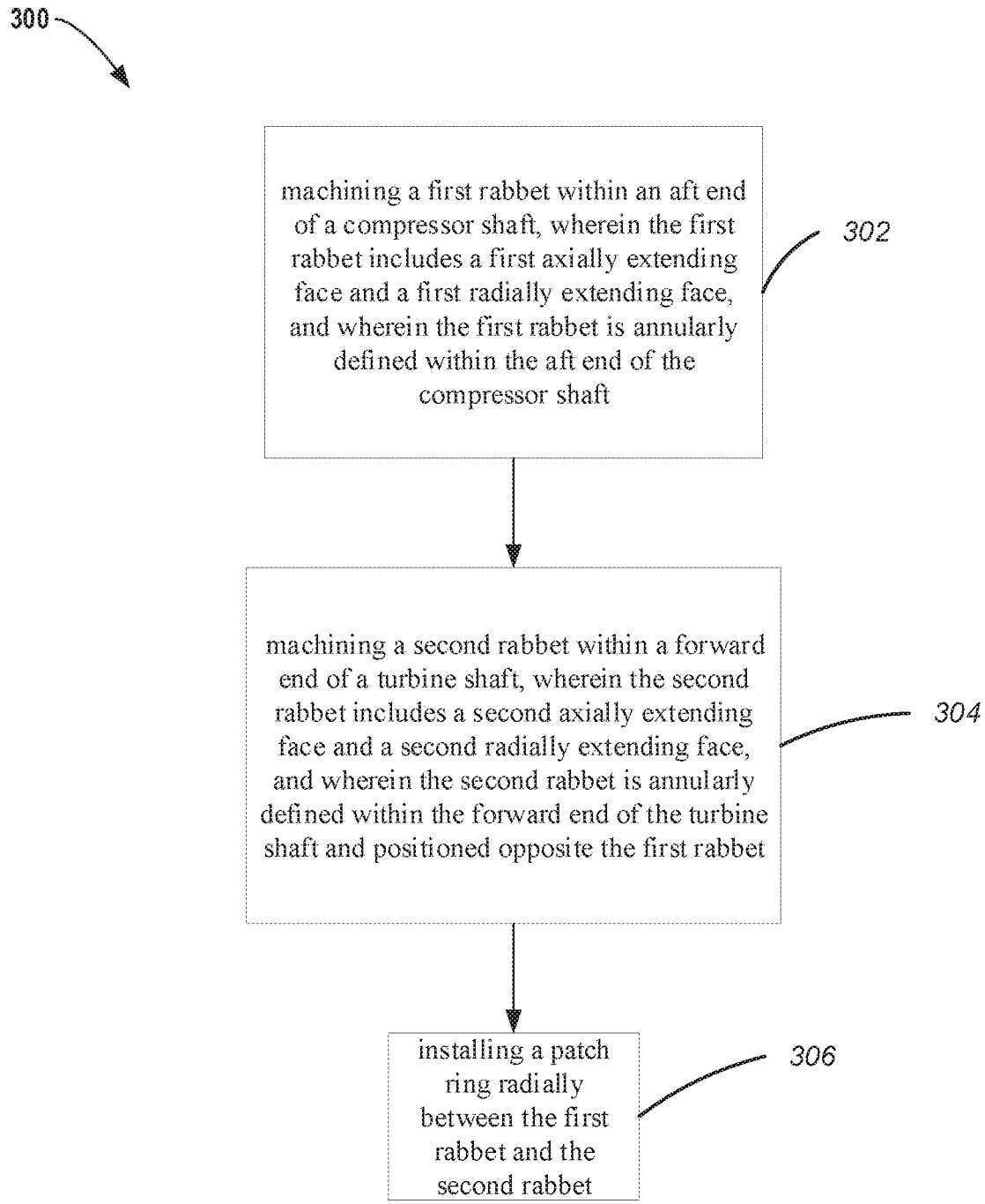
FIG. 9 illustrates a method of servicing a turbomachine in accordance with embodiments of the present disclosure.

FIG. 9 provides a flow chart which graphically illustrates a method 300 of servicing a turbomachine, such as the gas turbine 10 described herein, in accordance with one or more additional example embodiments of the present disclosure. As illustrated in FIG. 9, the method 300 may include a step 302 of machining a first rabbet 62 within an aft end 51 of a compressor shaft, such step may occur, of example, after initial operation of gas turbine 10. The first rabbet 62 may include a first axially extending face 66 and a first radially extending face 68. Further, the first rabbet may be annularly defined within the aft end 51 of the compressor shaft 50. The method 300 may further include a step 304 of machining a second rabbet 64 within a forward end 53 of a turbine shaft 52. The second rabbet 64 may include a second axially extending face 70 and a second radially extending face 72. Further, the second rabbet 64 may be annularly defined within the forward end 53 of the turbine shaft 52 and positioned opposite the first rabbet 62. The method 300 may also include a step 306 of installing a patch ring radially between the first rabbet 62 and the second rabbet 64.

During operation of the gas turbine 10, the main body 102 of patch ring 100 may function to provide the design-intended interference between the first axially extending face 66 and second axially extending face 70, even after the surfaces have undergone servicing and/or machining. For example, the pre-machined rabbets 54, 56 shown in FIG. 2 may be subjected to wear during operation of gas turbine 10 that requires the various surfaces of the pre-machined rabbets 54, 56, e.g. the axially extending faces 55, 57, to be serviced to restore the required interference. The patch ring 100 provides the required interference between the rabbets 62, 64 (or post-machined rabbets) after the gas turbine 10 has been serviced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A shaft assembly, comprising:
   a first shaft comprising a first rabbet annularly defined therein, the first rabbet including a first axially extending face and a first radially extending face;
   a second shaft coupled to the first shaft, the second shaft comprising a second rabbet annularly defined therein and positioned opposite the first rabbet, the second rabbet including a second axially extending face and a second radially extending face;
   a patch ring mounted between the first rabbet and the second rabbet, the patch ring comprising:
      a main body positioned between and in contact with the first axially extending face and the second axially extending face;
      a first arm extending radially outward from the main body; and
      a second arm extending radially inward from the main body.

2. The shaft assembly as in claim 1, wherein the first arm and the second arm of the patch ring are axially spaced from one another.

3. The shaft assembly as in claim 2, wherein the first arm of the patch ring contacts the second radially extending face of the second rabbet and the second arm of the patch ring contacts the first radially extending face of the first rabbet.

4. The shaft assembly as in claim 1, wherein the first arm and the second arm of the patch ring are coaxially aligned with one another.

5. The shaft assembly as in claim 2, wherein the first arm of the patch ring is a plurality of first arms circumferentially spaced apart from one another along the main body of the patch ring.

6. The shaft assembly as in claim 1, wherein the second arm of the patch ring is a plurality of second arms circumferentially spaced apart from one another along the main body of the patch ring.

7. The shaft assembly as in claim 1, wherein the first arm and the second arm are each one continuous annular member.

8. A turbomachine, comprising:
   a compressor section;
   a combustor section;
   a turbine section;
   a compressor shaft at least partially disposed in the compressor section, the compressor shaft having a first rabbet annularly defined therein, the first rabbet including a first axially extending face and a first radially extending face;
   a turbine shaft at least partially disposed in the turbine section and coupled to the compressor shaft, the turbine shaft having a second rabbet annularly defined therein and positioned opposite the first rabbet, the second rabbet including a second axially extending face and a second radially extending face; and
   a patch ring mounted between the first rabbet and the second rabbet, the patch ring including a main body, a first arm extending radially outward from the main body, and a second arm extending radially inward from the main body, and wherein the main body of the patch ring contacts the first axially extending face of the compressor shaft and the second axially extending face of the turbine shaft.

9. The turbomachine as in claim 8, wherein the first arm and the second arm of the patch ring are axially spaced from one another.

10. The turbomachine as in claim 8, wherein the first arm and the second arm of the patch ring are coaxially aligned with one another.

11. The turbomachine as in claim 8, wherein the main body of the patch ring is positioned radially between the first axially extending face and the second axially extending face.

12. The turbomachine as in claim 9, wherein the first rabbet of the compressor shaft and the second rabbet of the turbine shaft each comprise an outer surface, the outer surface of the first rabbet is disposed axially upstream of the second radially extending face of the second rabbet, and the outer surface of the second rabbet is disposed axially downstream of the first radially extending face of the first rabbet.

13. The turbomachine as in claim 9, wherein the first arm of the patch ring contacts the second radially extending face of the second rabbet and the second arm of the patch ring contacts the first radially extending face of the first rabbet.

14. The turbomachine as in claim 12, wherein a first gap is defined axially between the first arm of the patch ring and the outer surface of the first rabbet, and a second gap is defined axially between the second arm of the patch ring and outer surface of the second rabbet.

15. A method of servicing a turbomachine, the method comprising:
   machining a first rabbet within an aft end of a compressor shaft, wherein the first rabbet includes a first axially extending face and a first radially extending face, and wherein the first rabbet is annularly defined within the aft end of the compressor shaft;
   machining a second rabbet within a forward end of a turbine shaft, wherein the second rabbet includes a second axially extending face and a second radially extending face, and wherein the second rabbet is annularly defined within the forward end of the turbine shaft and positioned opposite the first rabbet; and
   installing a patch ring between the first rabbet and the second rabbet, the patch ring including a main body, a first arm extending radially outward from the main body, and a second arm axially spaced from the first arm and extending radially inward from the main body, and wherein the first arm of the patch ring contacts the second radially extending face of the second rabbet and the second arm of the patch ring contacts the first radially extending face of first rabbet.

16. The method as in claim 15, wherein the main body of the patch ring is positioned between and contacts the first axially extending face of the compressor shaft and the second axially extending face of the turbine shaft.

* * * * *